United States Defensive Publication [19] (H) [11] T962,002

Moore [43] Sept. 6, 1977

[54] ELASTIC WARP KNIT FABRIC

[76] Inventor: Francis Paul Moore, 1903 Harwyn Road, Wilmington, Del. 19810

[21] Appl. No.: 784,455

[22] Filed: Apr. 4, 1977

[51] Int. Cl.² ..... D04B 21/18

[52] U.S. Cl. ..... 66/195

[57] ABSTRACT

A Raschel warp knit structure of elastic (12) and non-elastic (10) yarns which produce a two-way stretch fabric. The new and unique feature of this invention is the stitch used to produce the fabric. The stitch consists of two groups of three chain stitches of non-elastic yarn into which is interlaced an elastic yarn. The elastic yarn traverses laterally in its path through the fabric to connect three adjacent wales.

1 Claim, 1 Sheet Drawing,

6 Pages Specification

The file of this unexamined application may be inspected and copies thereof may be purchased (849 O.G. 1221, Apr. 9, 1968).

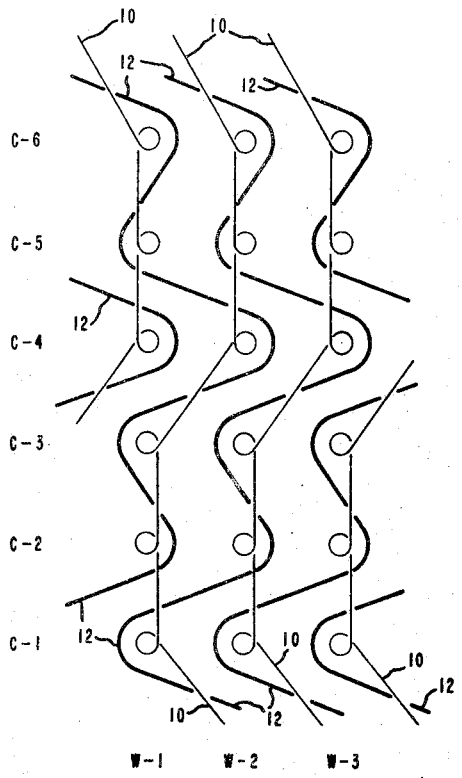

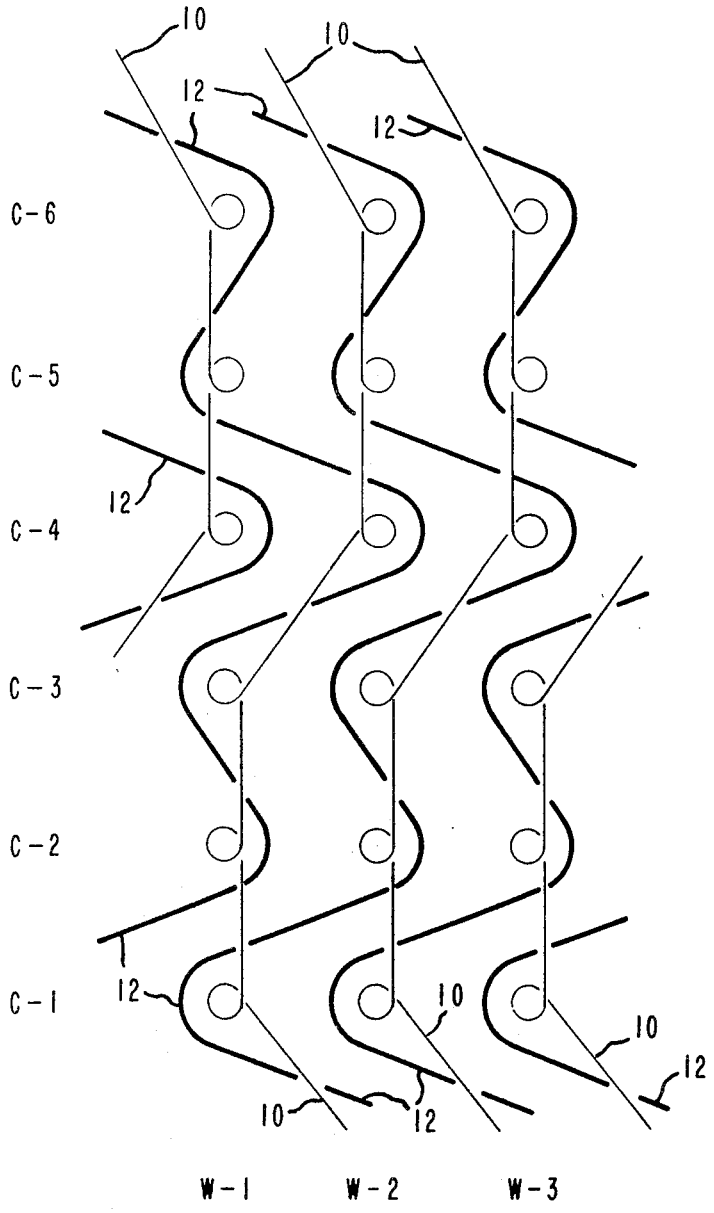
10
10
12
12
C-6
C-5
12
C-4
C-3
C-2
C-1
12
10
10
12
10
12
W-1
W-2
W-3